United States Patent [19]

Wilde, Jr.

[11] 3,989,281
[45] Nov. 2, 1976

[54] JOINT SYSTEM FOR FILAMENT WOUND ALUMINUM PIPE

[75] Inventor: Raymond S. M. Wilde, Jr., Wilmington, Del.

[73] Assignee: Hercules Incorporated, Wilmington, Del.

[22] Filed: Mar. 14, 1975

[21] Appl. No.: 558,398

[52] U.S. Cl. .............................. 285/45; 174/84 R; 285/286; 285/294
[51] Int. Cl.² ........................................ F16L 11/12
[58] Field of Search ............... 285/294, 21, 297, 45, 285/55, 47, 286; 138/153, 143, 172; 174/21 R, 76, 84 R

[56] References Cited
UNITED STATES PATENTS

| 3,003,798 | 10/1961 | Sandlin | 285/45 X |
|---|---|---|---|
| 3,623,968 | 11/1971 | Bohne | 285/45 X |
| 3,731,710 | 5/1973 | Bauer et al. | 138/143 |
| 3,744,823 | 7/1973 | Muir | 285/47 X |
| 3,854,756 | 12/1974 | Couch | 285/47 |
| 3,901,281 | 8/1975 | Morrisey | 138/153 X |

Primary Examiner—Dave W. Arola
Attorney, Agent, or Firm—Michael B. Keehan

[57] ABSTRACT

A system for joining aluminum pipe designed as a housing for electrical cable surrounded with oil under pressure is provided. The aluminum pipe sections which are to be joined are filament wound. The pipe sections are joined by welding or soldering. Sealing rings are filament wound into bonding engagement with the exterior of each pipe section near the mating ends thereof. The ends of the pipe are bare aluminum. A sleeve encompassing the joined pipes extends over at least the bare aluminum ends of the joined pipe sections. A cavity formed between the sleeve and the joined pipe sections is filled with a thermosetting polymeric compound which is cured. The joint system is designed to prevent both corrosion of the pipe and oil leakage past the sealing rings in the event of failure of a weld or solder joint.

7 Claims, 3 Drawing Figures

JOINT SYSTEM FOR FILAMENT WOUND ALUMINUM PIPE

This invention relates to a joint system for aluminum pipe which has been reinforced with high strength filaments in a matrix material (filament wound), which reinforced pipe is used to house electrical cable systems.

The hysteresis losses inherent in conventional high voltage pipe-type cable systems can be avoided by the use of nonferrous pipe as a housing for the cable. One such proposed system consists of electrical cables housed in aluminum pipe which has been reinforced with filament wound epoxy bonded fiber glass. Aluminum pipes are particularly suitable for use in housing electrical cables since they are nonmagnetic, have high electrical conductivity and possess good physical properties. The disadvantages to the use of aluminum pipe are rapid corrosion in the presence of air and water and insufficient strength in sections having a desired thickness. Such corrosion and strength deficiencies are substantially eliminated by reinforcing the aluminum pipe with a filament wound epoxy bonded high strength fiber. One problem associated with such filament reinforced pipes is that of connecting the pipes in such a manner as to preserve the protection and strength provided by the filament reinforced exterior of the pipe. While aluminum pipes can be soldered or welded, the soldering or welding operation can destroy the filament reinforcement. Therefore, a joint system has been needed for aluminum pipe sections which are filament reinforced in which the anticorrosion and strength improvements provided by the filament reinforcement are not destroyed by the joining operation.

The joint system of this invention is particularly suitable for use with aluminum pipes carrying high voltage electrical cables surrounded with oil under pressure. The oil is employed to maintain the electrical cables at a substantially constant temperature.

The joint system of this invention provides a means for protecting filament reinforced aluminum pipe sections which have been joined together from exposure to air, water, earth or any other environment which would tend to corrode or degrade the aluminum pipe. The joint system of this invention contains seals, so that in the event of an oil leak at the joint formed by engagement of the aluminum pipe sections, the flow of leaking oil would be restrained to a small area at the exterior surface of the aluminum pipe, beneath the filament reinforcement and between the seals forming a part of the joint system. The joint system for filament reinforced aluminum pipe of this invention further provides a means for permitting the joining of said pipe sections while maintaining the integrity of the filament reinforcement covering said pipe.

The joint system of this invention is fully illustrated in the drawings and the description which follows. In the drawings, like numbers refer to like parts where applicable.

Figure 1:
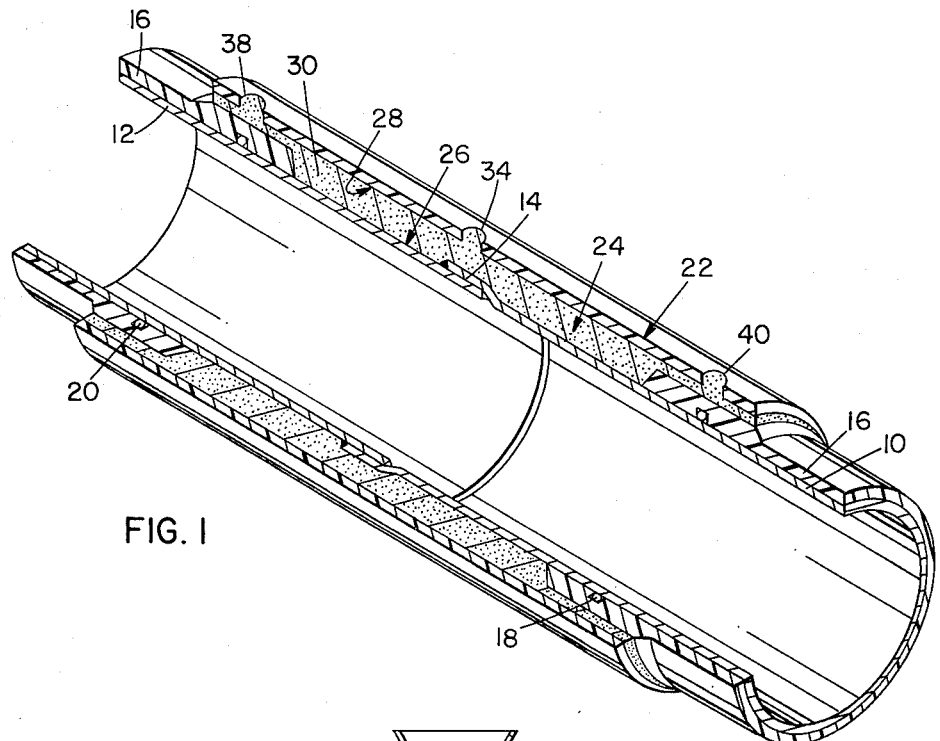
FIG. 1 is a perspective view broken away showing the joint system of this invention.
Figure 2:
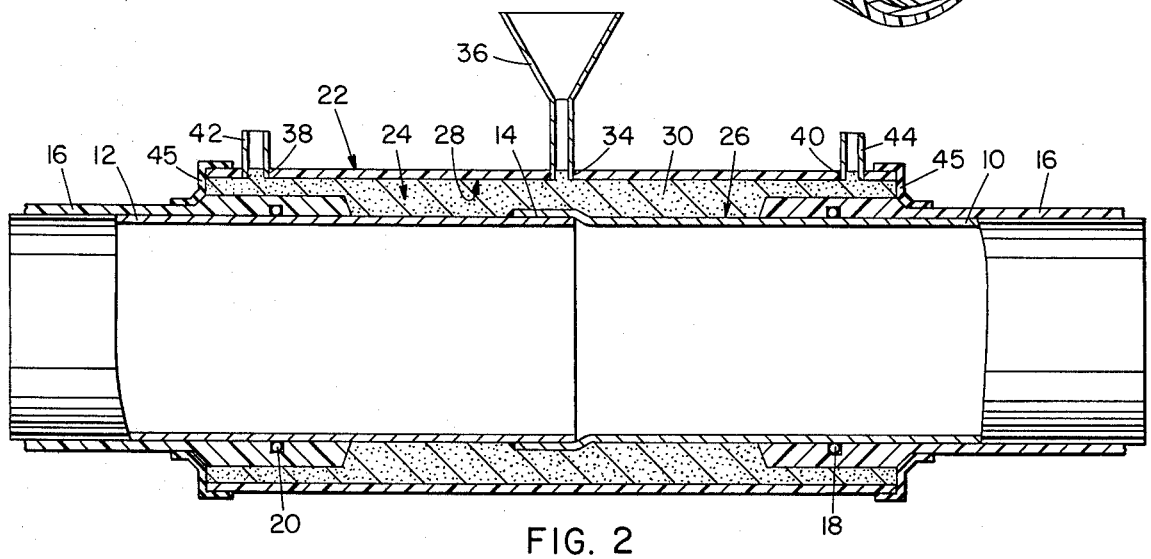
FIG. 2 is a side elevation, partially broken away and partially in section, of the joint system of FIG. 1, illustrating the system during assembly.

In FIGS. 1 and 2 a first pipe section 10 is shown in mating engagement with a second pipe section 12. The two pipe sections are soldered together forming joint 14. Each pipe section 10, 12 is filament wound throughout most of its length except for a short portion of the pipe adjacent each engagement end of each pipe section. Each pipe section 10, 12 has a sealing ring 18, 20 contiguous with the exterior surface of each section. The sealing rings 18, 20 extend about the circumference of each section 10, 12, respectively. The pipe sections are filament wound, i.e., reinforced with fiber in a matrix material. The filament winding 16 functions as a reinforcing material and this winding overlays each sealing ring 18, 20 so as to force each sealing ring 18, 20 into bonding engagement with the exterior surface of each pipe section 10, 12. A sleeve 22 encompasses sections 10, 12 which are in mating engagement. Sleeve 22 is comprised of a filament wound composite material. A cavity 24 (shown filled) is defined between the exterior surface 26 of pipe sections 10, 12 and the interior surface 28 of sleeve 22. Cavity 24 is filled with a thermosetting polymeric compound 30, commonly referred to as polymeric compound. Sleeve 22 has a central orifice 34 into which a funnel 36 can be inserted for the purpose of providing a convenient means for filling of the cavity 24 with polymeric compound 30. Sleeve 22 also has two additional orifices 38, 40 which function as a means to permit air entrapped in cavity 24 to be exhausted from said cavity during the filling of cavity 24 with polymeric compound 30. Standpipes 42, 44 are inserted in orifices 38, 40 to permit complete filling of cavity 24 with polymeric compound 30. Rubber tape 45 is employed to seal the open ends defined between sleeve 22 and pipe sections 10, 12 during a filling operation.

Figure 3:
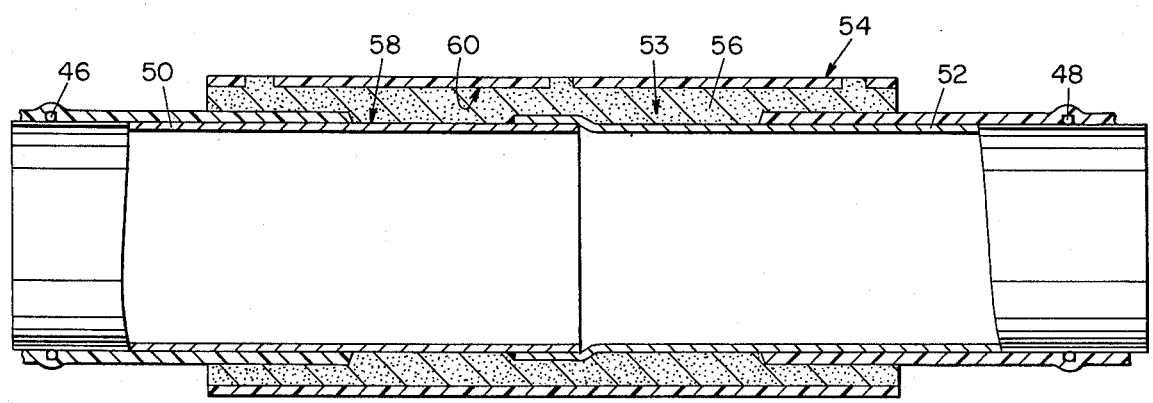
FIG. 3 is a side elevation, partially broken away and partially in section, of a second embodiment of the joint system of this invention.

In FIG. 3 a second embodiment of the pipe joint system of this invention is illustrated. In this embodiment, sealing rings 46, 48 are contiguous with the exterior surface of pipe sections 50, 52 which are in mating engagement. In this embodiment sealing rings 46, 48 are spaced adjacent to but outside of the area encompassed by sleeve 54. Sleeve 54 extends over the engagement end of each of pipe sections 50, 52 which are not filament reinforced and over a small portion of each pipe which is filament reinforced. Each sealing ring 46, 48 is forced into bonding engagement with the exterior surface of the aluminum pipe section with which it is contiguous. Sleeve 54 is uniformly spaced about the exterior surface of pipe sections 50, 52. A thermosetting polymeric compound 56 fills the cavity 53 defined between the exterior surface 58 of the joined pipe sections and the interior surface 60 of sleeve 54. Sleeve 54 is comprised of a filament reinforced composite material.

Filament wound aluminum pipe sections can be wound by known filament winding methods. It is important, however, to sand or roughen the exterior surface of the aluminum pipe in the circumferential direction with abrasive paper or cloth prior to winding. The roughened surface provides for a mechanical lock between the filament reinforcement and the aluminum. In preparing a filament wound aluminum pipe section it is important that the filament winding be stopped a short distance from the mating ends of the pipe so that the filament winding will not be damaged during the welding or soldering operation necessary to join the pipe sections.

At each end of a filament wound pipe section, it is preferable to wind a doubler which is a multiple layer filament winding exceeding the thickness of winding along the length of the pipe. The doubler is employed principally for purposes of aiding alignment of the aluminum joint of the aluminum pipe sections prior to joining. The doubler must be of a thickness sufficient to permit machining of the surface of the doubler without exposing the seal rings.

The precise method of joining the aluminum pipe sections, i.e., soldering or welding, does not constitute this invention. Aluminum pipes can be joined by methods known in the art for purposes of this invention.

The following description provides one suitable method by which the joint system of this invention is assembled. The aluminum pipe sections to be joined are filament wound throughout most of their length except at the mating ends thereof, which are bare aluminum. A sleeve, preferably filament wound, is inserted over one end of one pipe section. The pipe sections are then joined together and soldered or welded. Following the welding or soldering operation, the bare aluminum surfaces and filament wound surfaces forming part of the joint are cleaned free of any dirt or grease. Cleaning can be done wih a solvent such as trichloroethane and by use of an abrasive cloth as necessary. Following the cleaning operation, the sleeve is positioned so as to extend about equidistantly over the joined sections of the pipe. The sleeve contains at least one orifice which is used for insertion of polymeric compound and at least one orifice to permit entrapped air to escape from the cavity defined between the sleeve and exterior surface of the joined pipe sections during the filling operation. The sleeve is centered about the joined pipe sections by any suitable means, such as spacer blocks or shims. Spacer blocks are spaced around the circumference of the pipe between the pipe and sleeve at 90° intervals. In filling the space defined between the exterior surface of the joined pipe sections and the interior surface of the sleeve, it is necessary to close each of the openings defined at the ends of the sleeve between the interior surface of the sleeve and the exterior surface of the pipe sections. This can be done by any suitable means, such as with bands of rubber or with suitable tape. The thermosetting polymeric compound is next prepared. A funnel is inserted into one orifice in the sleeve and standpipes are inserted into the other orifices in the sleeve. The polymeric compound is poured into the funnel and then into the cavity defined between the interior surface of the sleeve and the exterior surface of the pipe sections being joined. When the entire cavity is filled with polymeric compound the funnel and standpipes are removed and the polymeric compound is cured. A strong, corrosion-resistant and substantially leakproof pipe joint system results.

The polymeric compound employed in the joint system of this invention includes all types of thermosetting polymers. The type of thermosetting polymer is not critical. It is much preferred, however, to employ as the polymeric compound a thermosetting polymer which has a reasonable pot life, i.e., of at least about thirty minutes, which has good mechanical and physical properties, and which can be heat-cured with a cross-linking agent at relatively low temperatures, say, at less than about 80° F. Particularly suitable polymeric compound can be prepared from epoxy resins and cross-linked with known cross-linking agents for epoxy resins. Preferred epoxy resins are those prepared by condensation of epichlorohydrin with bisphenol A. Illustrative cross-linking agents are aliphatic amines, such as diethylenetriamine, triethylenetetramine, and the like; aromatic amines such as methylene dianiline, m-phenylenediamine, and the like; anhydrides such as phthalic anhydride, tetrahydrophthalic anhydride, methyltetrahydrophthalic anhydride, and the like.

Any of the well known high strength filamentary materials can be used as the filaments for reinforcement of the aluminum pipe employed in the joint system of this invention. Illustrative high strength fibers which can be employed include glass, graphite, and carbon fibers.

An important aspect of the present invention is the use of sealing rings which are placed over the mating ends of the pipe sections being joined. These sealing rings function to prevent seepage of any oil which might leak from the welded or soldered aluminum pipe joint from passing throughout the length of the pipe beneath the filament reinforced sections. The sealing rings can be prepared from elastomers, such as, polychlorobutadiene, polybutadiene, butyl rubber, nitrile rubber, silicon rubber, and the like.

The sleeve which encompasses the joined aluminum pipe sections can be prepared from any suitable material which would provide suitable corrosion protection to the joint system. The sleeve is preferably prepared from a filament reinforced composite material. Other materials from which sleeves can be prepared include plastics, metals, and metals reinforced with filaments in a matrix material.

What I claim and desire to protect by Letters Patent is:

1. A joint system for filament reinforced aluminum pipe comprising (a) at least a first aluminum pipe section and a second aluminum pipe section, each pipe section having mating ends, and each pipe section being in direct contact with and reinforced throughout its length, except for a small portion of the length of each pipe adjacent the mating ends thereof, with high strength filaments in a matrix material, each pipe section having a seal means contiguous with the external surface of the aluminum pipe about the circumference thereof, said seal means being forced into engagement with the external surface of each pipe by the filament reinforcement wound over said seal means of each pipe and said seal means being spaced from the end of the filament reinforcement at the mating end of each pipe section, said pipe sections being in mating engagement and welded or soldered at the junction of the mating pipe ends, (b) a sleeve encompassing said pipe sections and having an interior surface surrounding and spaced from said joined pipe sections thereby defining a cavity between the exterior surface of said joined pipe sections and the interior surface of said sleeve, said sleeve bridging the junction of said joined pipes, and being of a sufficient length to extend over the portions of each pipe section which is not filament reinforced, and (c) a cured thermosetting compound filling said cavity.

2. The joint system of claim 1 in which the matrix material is epoxy resin.

3. The joint system of claim 2 in which the high strength filaments are glass filaments.

4. The joint system of claim 2 in which the high strength filaments are graphite filaments.

5. The joint system of claim 2 in which the high strength filaments are carbon filaments.

6. The joint system of claim 1 in which the sleeve is prepared from a filament reinforced composite material.

7. The joint system of claim 1 in which the sleeve is prepared from metal reinforced by filaments in a matrix material.

* * * * *

UNITED STATES PATENT AND TRADEMARK OFFICE
CERTIFICATE OF CORRECTION

PATENT NO. : 3,989,281
DATED : November 2, 1976
INVENTOR(S) : Raymond S. M. Wilde, Jr.

It is certified that error appears in the above—identified patent and that said Letters Patent are hereby corrected as shown below:

Page 1, column 1, block [73]; delete "Hercules Incorporated" and substitute --Haveg Industries, Inc.-- therefor.

Signed and Sealed this

Tenth Day of May 1977

[SEAL]

Attest:

RUTH C. MASON
Attesting Officer

C. MARSHALL DANN
Commissioner of Patents and Trademarks